United States Patent [19]

Kurosu et al.

[11] Patent Number: 4,494,846
[45] Date of Patent: Jan. 22, 1985

[54] ELECTROMAGNETIC SHUTTER

[75] Inventors: Tomio Kurosu, Iwatsuki; Yukio Yoshikawa, Tokyo, both of Japan

[73] Assignee: Copal Company Limited, Tokyo, Japan

[21] Appl. No.: 436,567

[22] Filed: Oct. 25, 1982

[30] Foreign Application Priority Data

Oct. 27, 1981 [JP] Japan ................... 56-159799
Oct. 27, 1981 [JP] Japan ................... 56-159800

[51] Int. Cl.$^3$ ............... G03B 7/08; G03B 7/26; G03B 9/08
[52] U.S. Cl. ................... 354/400; 354/412; 354/435; 354/484; 354/234.1
[58] Field of Search ........... 354/26, 29, 30, 50, 354/51, 48, 230, 234, 235, 400, 412, 435, 484, 234.1

[56] References Cited

U.S. PATENT DOCUMENTS 3,927,415 12/1975 Petersen .................. 354/235 X
4,290,683 9/1981 Bagdis .................... 354/234

Primary Examiner—William B. Perkey
Attorney, Agent, or Firm—McAulay, Fields, Fisher, Goldstein & Nissen

[57] ABSTRACT

The electromagnetic shutter in a camera having an exposure control circuit comprises shutter blades for opening and closing the aperture of the shutter, a shutter control circuit having a photoelectric element for measuring the scene brightness so as to generate the proper exposure signal, holding means for releasably holding the shutter blades in closed positions, spring means for opening the shutter blades when the shutter blades in the closed positions are released, and electromagnetic driving means actuated by the proper exposure signal for driving the shutter blades from the open positions to the closed positions against the action of spring means so as to permit the shutter blades to be held in the closed positions by the holding means. An energy saving is thereby achieved, because it is only necessary to actuate the holding means so as to release the shutter blades in the closed positions to open the shutter blades by the action of the spring means and to actuate the electromagnetic driving means for moving the shutter blades from open positions to closed positions at which the shutter blades are retained by the holding means.

12 Claims, 10 Drawing Figures

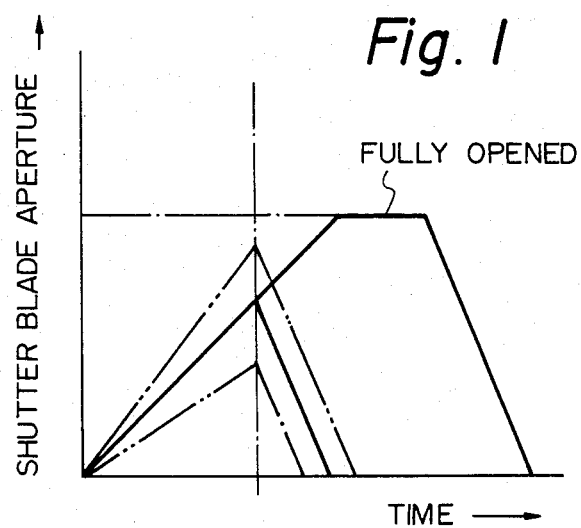
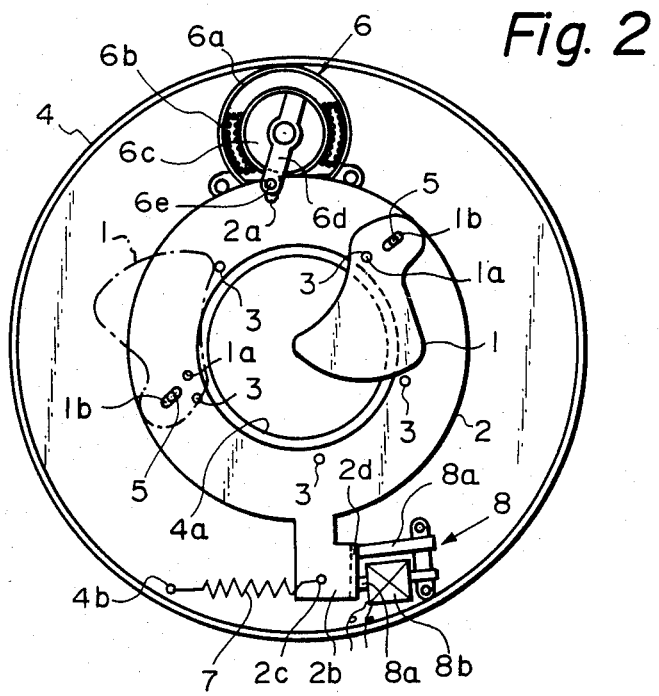

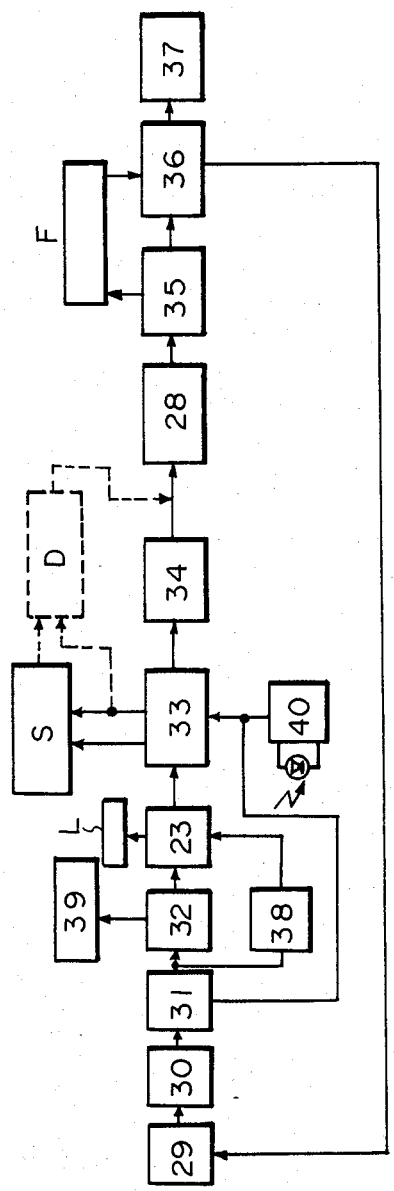

ELECTROMAGNETIC SHUTTER

BACKGROUND OF THE INVENTION

The present invention relates to an electromagnetic shutter in a camera having an exposure control circuit, and, more particularly, to an electromagnetic shutter of the type described above which generates a shutter blade closure detecting signal for enabling the shutter to be used in a fully automated camera sequential operation control circuit without causing any false functions.

A prior art electromagnetic shutter has a rotatable sector ring for permitting the shutter blades to be swung between the fully closed positions and the fully opened positions, shutter blade closing spring means for driving the sector ring so as to swing the shutter blades to the fully closed positions, and electromagnetic driving means including a rotor made of a permanent magnet and a stationary electric coil cooperating with the rotor, which rotor is coupled with the sector ring. When the electric coil is energized and continues to be energized by an exposure control circuit, the sector ring is driven by the rotor so as to open the shutter blades from the closed position and continue to open against the action of the shutter blade closing spring means during the time the electric coil continues to be energized. After a predetermined time period for the proper exposure, when the electric coil is deenergized by the operation of the exposure control circuit, the sector ring is driven by the shutter blade closing spring means so as to close the shutter blades to terminate the proper exposure.

It has also been proposed to use electromagnetic driving means including a stationary permanent magnet and a movable electric coil cooperating with the stationary permanent magnet in place of the above described electromagnetic driving means. Such an electromagnetic shutter is disclosed in Japanese Patent Public Disclosure No. 101924/80.

Since the prior art electromagnetic shutters, however, utilize the shutter blade closing spring means, the shutter blades must be opened and kept opened for the proper exposure against the action of the shutter blade closing spring means by the electromagnetic driving means which must be energized and kept energized during the proper exposure time period, and, therefore, the consumed electric current is very large. Further, since the opening operation of the shutter blades is effected by the differential force between the electromagnetic driving means and the shutter blade closing spring means, the opening operation of the shutter blades is unstable and suffers from a large fluctuation of the operation of the shutter blades.

This is particularly remarkable in the case of an electromagnetic programming shutter in which the shutter blades serve as a diaphragm stop, i.e. the shutter blades are closed before they are fully opened depending upon the scene brightness, so that the opening velocity of the shutter blades varies widely and the operation of the shutter is made very unstable.

Further, when an electromagnetic shutter is used with an automatic camera sequential operation control circuit so as to effect automatically and sequentially the lens focusing, lens resetting, film winding and film rewinding, etc., means is required in order to accurately effect the above described sequential operations without fail, which generates a shutter blade closure detecting signal when the shutter blades are brought to the closed position and supplies the signal to the sequential operation control circuit.

Heretofore, a contact switch has been used for generating the shutter blade closure detecting signal which is actuated by the movement of the sector ring. However, loss of mechanical energy due to the movement of the mechanical parts of the contact switch and loss of electric energy due to the connection and disconnection of the contacts of the contact switch can not be avoided.

SUMMARY OF THE INVENTION

It is an object of the present invention to provide an electromagnetic shutter which avoids the above described disadvantages of the prior art electromagnetic shutter.

Another object is to provide an electromagnetic shutter which is simple in construction and accurate in operation but requires only a little energy for the operation thereof.

A further object is to provide an electromagnetic shutter of the type described above which can be used with an automatic camera sequential operation control circuit without causing any false functions by utilizing a contactless switch thereby greatly reducing any mechanical and electrical loss of energy in the operation of the shutter.

The above object is achieved by providing an electromagnetic shutter in a camera having an exposure control circuit comprising shutter blades for opening and closing the aperture of the shutter, a shutter control circuit having a photoelectric element for measuring the scene brightness so as to generate a proper exposure signal, holding means for releasably holding said shutter blades in the closed position, spring means for opening the shutter blades when the holding of the shutter blades in the closed positions is released, and electromagnetic driving means actuated by the proper exposure signal for driving the shutter blades from the opened positions to the closed positions against the action of the spring means so as to permit the shutter blades to be held in the closed positions by the holding means.

With the above described construction, the energy required for driving the shutter is greatly saved, because it is only necessary to actuate the holding means so as to release the holding of the shutter blades in the closed positions for initiating the opening of the shutter blades by the action of the spring means and to actuate the electromagnetic driving means for moving the shutter blades from the opened positions to the closed positions at which the shutter blades are held by the holding means.

In accordance with a further characteristic feature of the present invention, the electromagnetic driving means may be provided with a braking circuit actuated during the time the shutter blades are being opened so as to apply a braking force to the shutter blades correspondingly to the opening operation of the shutter blades against the opening spring means thereby lowering the opening velocity of the shutter blades.

By the provision of the braking circuit, the accuracy of the exposure can be greatly improved, while the tolerance of the force of the opening spring means can be increased because the opening velocity of the shutter blades by the spring means can be adjusted by adjusting a resistance through which the braking circuit actuates the electromagnetic driving means so as to reduce the opening velocity of the shutter blades.

In accordance with a still further characteristic feature of the present invention, the holding means may comprise composite magnet means consisting of a permanent magnet and an electric coil wound thereon, so that, when the electric coil is energized, the composite magnet means releases the shutter blades having been held in the closed positions by the permanent magnet by virtue of the electromagnetic force generated by the electric coil acting against the magnetic force of the permanent magnet.

By the provision of the composite magnet means consisting of the permanent magnet and the electric coil wound thereon as described above, a shutter blade closure detecting signal may be generated by the electric coil when the shutter blades are brought to the closed positions by virtue of the fact that the magnetic field generated by the permanent magnet varies at the time the shutter blades are closed and held by the holding means thereat. Such a shutter blade closure detecting signal is required in the automatic camera sequential operation control circuit in order to insure correct and accurate sequential operation of the camera.

BRIEF DESCRIPTION OF THE DRAWINGS

FIG. 1 is a diagram showing the variation in the aperture of shutter blades of an electromagnetic shutter as the time elapses during the time they are opened and closed;

FIG. 2 is a plan view showing the main portion of an embodiment of the electromagnetic shutter constructed in accordance the present invention;

FIG. 10 is a diagram showing an example of an automatic camera sequential operation control circuit suitable for incorporating the control circuit of FIG. 8.

DETAILED DESCRIPTION OF THE PREFERRED EMBODIMENTS

Figure 3:
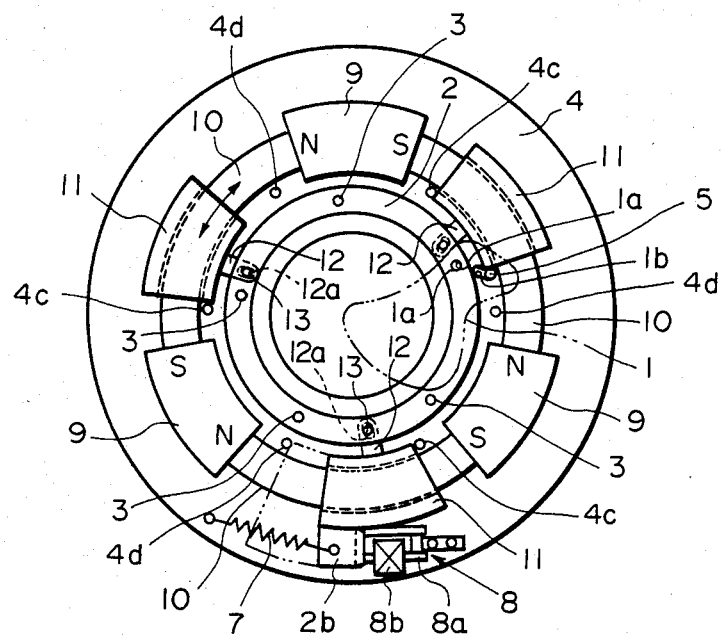
FIG. 3 is a plan view similar to FIG. 2 but showing another embodiment of the electromagnetic shutter of the present invention.

FIG. 1 shows the characteristic curves of the aperture of the shutter blades during the time the shutter blades are opened and closed, wherein the solid line shows the normal operation of the shutter blades which are closed after they have been fully opened, while one-dot chain line shows the characteristic curve in the case the opening velocity of the shutter blades is lower than the normal velocity and the shutter blades are reclosed before they are fully opened, the two-dot chain line showing the characteristic curve similar to the one-dot chain line but the opening velocity of the shutter blades being higher than the normal velocity. As seen from FIG. 1, the exposure is remarkably varied depending upon the variation in the opening velocity of the shutter blades particularly in the case the shutter blades are closed before they are fully opened, i.e. in the case the shutter is used as a programming shutter.

The present invention positively avoids the above described disadvantages.

With reference to FIG. 2 showing an embodiment of the electromagnetic shutter of the present invention, it comprises five shutter blades 1. Each shutter blade 1 has a circular hole 1a and an elongated hole 1b, and the circular hole 1a rotatably engages with a pin 3 secured to a rotatable sector ring 2 while the elongated hole 1b slidably engages with a pin 5 secured to an upper base plate (not shown) of the shutter, while a lower base plate 4 has an exposure aperture 4a similar to that formed in the upper base plate around which the sector ring 2 is reciprocally rotated so that, when the sector ring 2 is rotated in the clockwise direction from the position shown in FIG. 2, the shutter blades 1 can be swung from the closed positions shown by the solid line to the fully opened positions shown by the chain line, and, when the sector ring 2 is rotated in the counter-clockwise direction from the position at which the shutter blades 1 are fully opened, the shutter blades 1 are brought to the closed positions. Stopper means (not shown) are provided in order to limit the swinging movement of the shutter blades 1 between the closed positions and the fully opened positions.

The sector ring 2 is provided with a U-shaped cut-out portion 2a opened in the periphery of the sector ring 2 and a projecting arm 2b projecting from the periphery of the sector ring 2 as shown.

In order to open the shutter blades 1, an opening spring 7 is provided one end of which is secured to the hole 2c formed in the arm 2b while the other end is secured to a pin 4b secured to the base plate 4 so that the sector ring 2 is urged in the clockwise direction by the action of the spring 7 so as to open the shutter blades 1. In order to close the shutter blades 1 and releasably hold the shutter blades 1 in the closed positions, an electromagnetic, driving means, i.e., an electromagnetically driven motor 6 and a composite magnet means 8 serving as the holding means are provided.

The motor 6 comprises a circular yoke 6a, a stationary electric coil 6b, a rotor 6c made of a permanent magnet and an actuating arm 6d secured to the rotor 6c and having a pin 6e at the free end thereof, which pin slidably engages with the U-shaped cut-out portion 2a of the sector ring 2. Thus, when the electric coil 6b is energized so as to rotate the rotor 6c together with the arm 6d in the clockwise direction from the position at which the sector ring 2 is urged by the spring 7 so as to hold the shutter blades 1 in the opened positions, the sector ring 2 is rotated against the action of the spring 7 in the counterclockwise direction by means of the pin 6e of the arm 6d slidably engaging the cut-out portion 2a of the sector ring 2 so that the shutter blades 1 are brought to the closed positions.

The composite magnet means 8 is mounted on the base plate 4 and comprises a permanent magnet 8a cooperating with a magnetizable bent portion 2d formed at the side of the arm 2b, and a combined electric coil 8b wound around the permanent magnet 8a acting to reduce the magnetic force of the permanent magnet 8a when energized.

Thus, when the motor 6 is energized so that the sector ring 2 is brought to the position at which the shutter blades 1 are closed while the electric coil 8b is not energized, the permanent magnet 8a attracts the bent portion 2d of the arm 2b and holds the sector ring 2 against the action of the spring 7 at the position at which the shutter blades 1 are closed. Thereafter, when the electric coil 8b is energized so as to generate an electromagnetic force acting against the magnetic force of the permanent magnet 8a, the attraction of the bent portion 2d of the arm 2b by the permanent magnet 8a is released so that the sector ring 2 is rotated in the clockwise direction by the action of the spring 7 thereby swinging the shutter blades 1 to the opened positions. It is only necessary to energize the electric coil 8b for a very short time period in order to release the holding of the sector ring 2 by the permanent magnet 8a so as to open the shutter blades 1. When the motor 6 is energized before the shutter blades 1 are not fully opened depending upon the scene brightness by the operation of a control circuit described later for the proper exposure, closing operation of the shutter blades 1 commences so that the shutter acts as a programming shutter. The shutter blades 1 are held in the fully opened positions by the action of the spring 7 without requiring any electric energy when they have been swung in the fully opened positions until the electric coil 6b of the motor 6 is energized by the control circuit so as to close the shutter blades 1 for the proper exposure. It is only necessary to energize the motor 6 for a short time period until the sector ring 2 is brought to the position at which the shutter blades 1 are closed at which time the sector ring 2 is held at that position by the permanent magnet 8a, because the electric coil 8b has been deenergized.

The number of the electromagnetically driven motor 6 may be made two or more depending upon the design of the shutter.

FIG. 3 shows an alternative embodiment of the electromagnetic shutter of the present invention. In this embodiment, the electromagnetic driving means comprises in place of the motor 6 a plurality of permanent magnets 9,9,9, . . . connected by annular cores 10,10,10, . . . , on each of which cores a movable electric coil 11 is shiftably mounted. Each electric coil 11 has an inwardly extending arm 12 having an elongated hole 12a at its free end which engages with a pin 13 secured to the sector ring 2 so that the sector ring 2 is moved together with the electric coils 11 in the counterclockwise direction so as to close the shutter blades 1 when the electric coils 11 are energized in the similar manner as the embodiment shown in FIG. 2. In the embodiment shown in FIG. 3, the arm 2b having the magnetizable bent portion cooperating with the composite magnet means 8 is secured to one of the electric coils 11 and the spring 7 is provided so as to urge the arm 2b in the clockwise direction for opening the shutter blades 1 as in the case of the embodiment shown in FIG. 2. Stopper pins 4c and 4d are secured to the base plate 4 so as to limit the movement of the respective electric coils 11 between the opened positions and the closed positions of the shutter blades 1. The operation of the embodiment shown in FIG. 3 is similar to that shown in FIG. 2.

Figure 4:
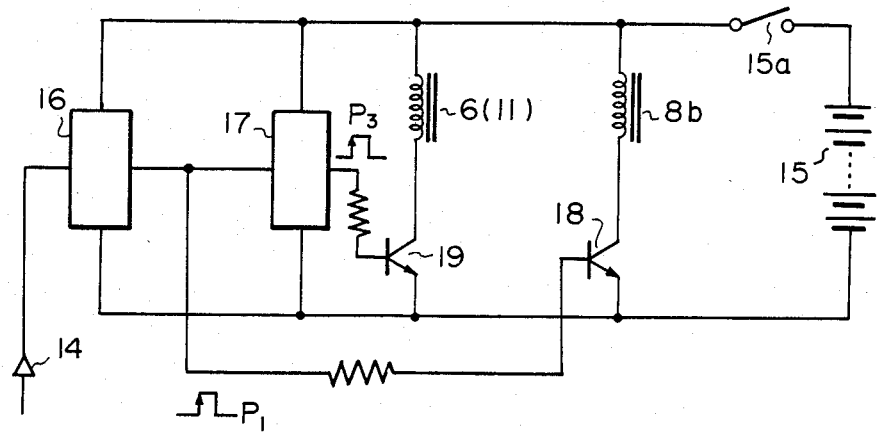
FIG. 4 is a diagram showing the control circuit of the present invention.

FIG. 4 shows a control circuit for the electromagnetic shutter of the present invention.

This control circuit comprises an input terminal 14 adapted to receive the output from a central processing unit (not shown) for effecting the automatic sequential operations of the camera, an electric power source 15, a shut-off switch 15a for the power source 15, a one shot multivibrator circuit 16 connected to the respective terminals of the power source 15 through the switch 15a and receiving the signal from the input terminal 14 so that a short one shot output pulse $P_1$ is issued therefrom each time the signal is received, and an exposure control circuit 17 having a photoelectric element (not shown) for measuring the scene brightness for the proper exposure and connected to the output of the one shot circuit 16 so that a short output pulse $P_3$ is issued upon elapsing a proper exposure time after receipt of the pulse $P_1$, the output of the one shot circuit 16 being also connected to the base of a transistor 18 through a resistance, while the combined electric coil 8b of the composite magnet means 8 is connected to the respective terminals of the power source 15 through the switch 15a as well as through the collector and the emitter of the transistor 18.

The output of the exposure control circuit 17 is connected to the base of a transistor 19 through a resistance and the electromagnetically driven motor 6 or the movable electric coils are connected to the respective terminals of the power source 15 through the switch 15a as well as through the collector and the emitter of the transistor 19.

In operation, when the switch 15a is closed and a signal from the input terminal 14 is received by the one shot circuit 16, it issues a one shot pulse $P_1$ which is applied to the base of the transistor 18 so as to render the same to be conductive thereby energizing the combined electric coil 8b for a short time period to generate the electromagnetic force acting against the magnetic force of the permanent magnet 8a so that the holding of the sector ring 2 in the closed positions of the shutter blades 1 by the magnetic force of the permanent magnet 8a is released to rotate the sector ring 2 in the clockwise direction by the action of the spring 7 thereby opening the shutter blades 1. On the other hand, the pulse $P_1$ is also supplied to the exposure control circuit 17 so that a proper exposure pulse $P_3$ is generated after a proper exposure time elapses after receipt of the pulse $P_1$, and the pulse $P_3$ is supplied to the base of the transistor 19 so that it is rendered to be conductive to energize the motor 6 or the electric coils 11 thereby rotating the sector ring 2 to the position for bringing the shutter blades 1 to the closed positions, at which they are held by virtue of the magnetic attraction of the sector ring 2 at that position by the permanent magnet 8a with the electric coil 8b having been de-energized.

Figure 5:
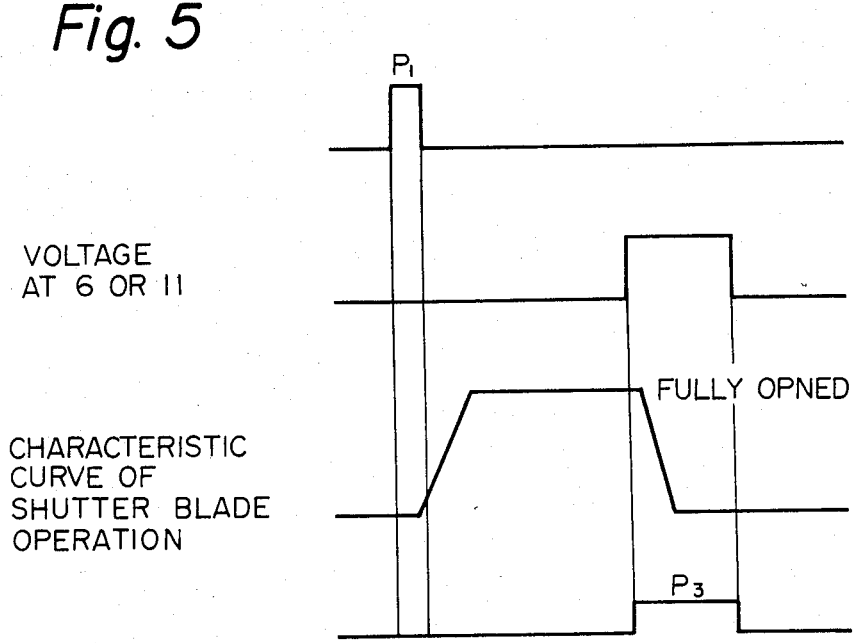
FIG. 5 is a time chart showing the operation of the circuit of FIG. 4 as the time elapses.

FIG. 5 shows the time chart of the operation of the control circuit shown in FIG. 4.

Figure 6:
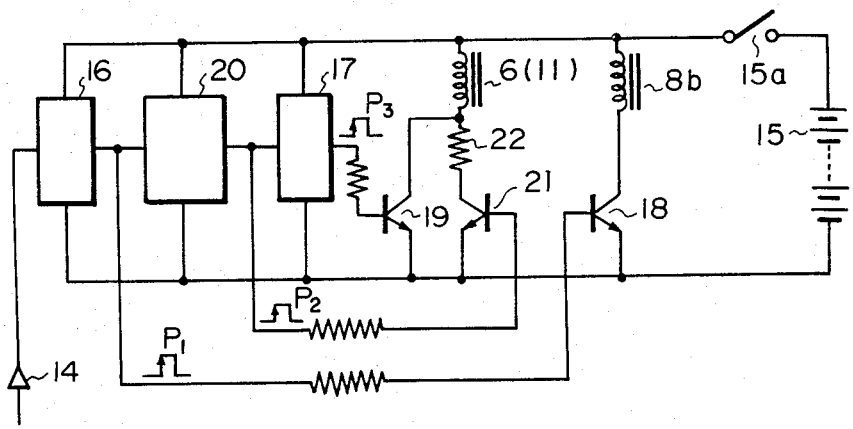
FIG. 6 is a diagram showing the modified form of the control circuit shown in FIG. 4.

FIG. 6 shows a modified form of the control circuit of FIG. 4. The control circuit shown in FIG. 6 is generally similar to that shown in FIG. 4 except that a braking circuit 20 is additionally provided in the control circuit of FIG. 6 for lowering the opening velocity of the shutter blades 1 so as to improve the accuracy of the exposure. This is particularly effective in the case in which the shutter is used, because the control of the timing of reversing the opening movement of the shutter blades 1 to the closing movement thereof is difficult particularly in the case the opening velocity of the shutter blades 1 is high and they are closed before they reach the fully opened positions, thereby resulting in large fluctuation of the diaphragm aperture or the shutter speed so that the accuracy of the exposure is widely deteriorated.

In FIG. 6, the input of the braking circuit 20 is connected to the output of the one shot circuit 16 and the output thereof is connected to the input of the exposure control circuit 17 so that the braking circuit 20 is actuated by the pulse $P_1$ from the one shot circuit 16 so as to issue a braking pulse $P_2$ which is supplied to the exposure control circuit 17 for actuating the same.

The output of the braking circuit 20 is also connected through a resistance to the base of a transistor 21 and the junction of the collector of the transistor 19 and the motor 6 or the electric coils 11 is connected through a resistance 22 to the collector of the transistor 21, while the emitter of the transistor 21 is connected to one of the terminals of the power source 15 to which the emitter of the transistor 19 is connected.

With the construction described above, when the electric coil 8b is energized through the transistor 18 by the pulse $P_1$ generated by the one shot circuit 16 upon receipt of a signal from the input terminal 14 so as to release the holding of the sector ring 2 and open the shutter blades 1 by the force of the spring 7, the braking circuit 20 is also actuated during the opening operation of the shutter blades 1 so that an output pulse $P_2$ is generated which is supplied to the base of the transistor 21 to render the same to be conductive so that the motor 6 or the electric coils 11 are energized with a lowered voltage by the provision of the resistance 22 thereby giving a braking force to the shutter blades 1 which are being opened by the force of the spring 7 so as to reduce the opening velocity of the shutter blades 1 to improve the accuracy of the control of the exposure. By adjusting the value of the resistance 22, the variation in the force of the spring 7 causing the variation in the opening velocity of the shutter blades 1 can be compensated for.

Figure 7:
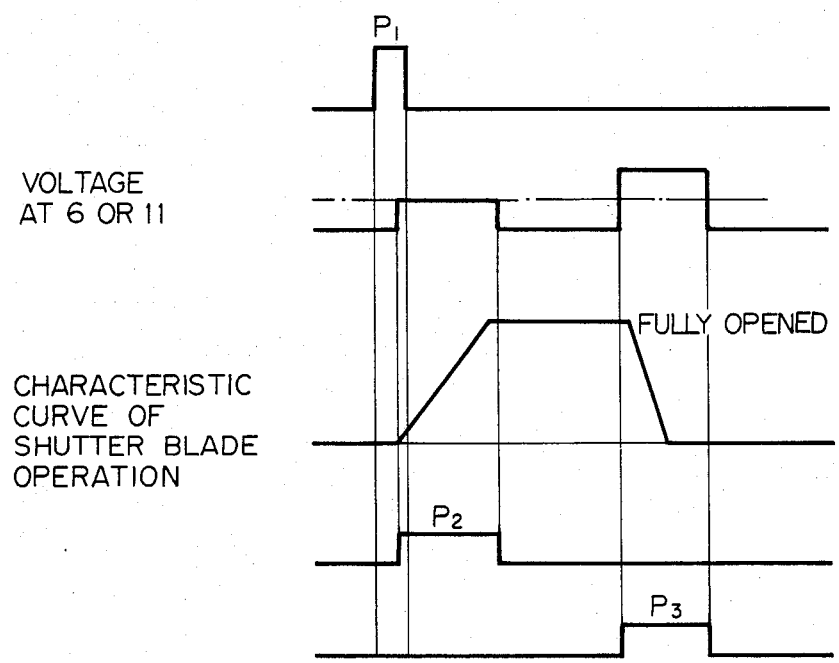
FIG. 7 is a time chart showing the operation of the circuit shown in FIG. 6 as the time elapses.

FIG. 7 shows a time chart showing the operation of the control circuit shown in FIG. 6. As is clear from FIG. 7, the slope of the characteristic curve of the shutter blades 1 in the range of opening thereof is made more gentle in comparison with the case in which no braking circuit is provided.

Figure 8:
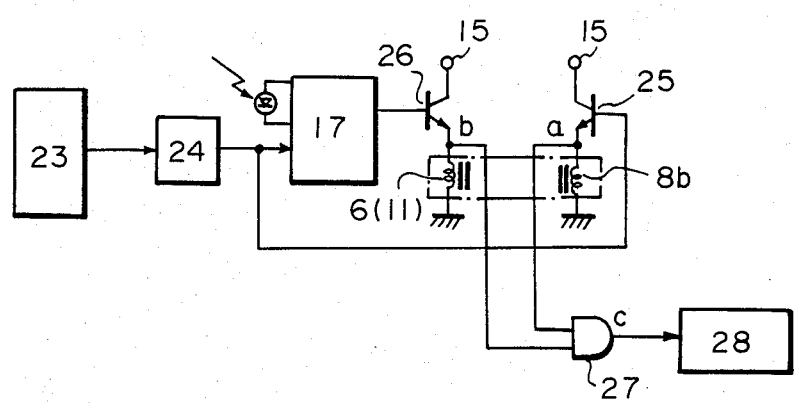
FIG. 8 is a diagram showing the still further modified form of the control circuit for generating a shutter blade closure detecting signal.

FIG. 8 shows a further modified form of the control circuit of the present invention.

In FIG. 8, the exposure control circuit 17 is connected to the output of a one shot circuit 24 receiving a signal from a focusing circuit 23 of an automatic camera sequential operation control circuit shown in FIG. 10 so as to issue a short output pulse at the time of termination of the focusing operation which actuates the exposure control circuit 17 for issuing a proper exposure signal upon elapsing of the proper exposure time after the shutter blades 1 are opened. The output of the one shot circuit 24 is also supplied to the base of a transistor 25 and the collector of the transistor 25 is connected to the power source 15 while the emitter thereof is connected to one end of the electric coil 8b of the composite magnet means 8 and the other end thereof is grounded, so that the transistor 25 is rendered to be conductive by the output pulse from the one shot circuit 24 so as to energize the electric coil 8 to open the shutter blades 1 as described previously.

The output of the exposure control circuit 17 is connected to the base of a transistor 26, the collector of which is connected to the power source 15 while the emitter is connected to one end of the motor 6 or the electric coils 11, the other end thereof being grounded. Therefore, after elapsing of the proper exposure time after the shutter blades 1 are opened, the transistor 26 is rendered to be conductive by the proper exposure signal issued by the exposure control circuit 17 so that the motor 6 or the electric coils 11 are energized to close the shutter blades 1 as previously described.

According to the characteristic feature of the present invention, the junction a between the electric coil 8b and the emitter of the transistor 25 is connected to one of the input terminals of an AND circuit 27 and the junction b between the motor 6 or the electric coils 11 and the emitter of the transistor 26 is connected to the other input terminal of the AND circuit 27 for issuing shutter blade closure detecting signal, while the output terminal C thereof is connected to a lens resetting circuit 28 of the automatic camera sequential operation control circuit shown in FIG. 10.

The motor 6 or the electric coils 11 must continue to be energized until the time shortly after the sector ring 2 has been rotated so as to be attracted by the permanent magnet 8a at which time the electric coil 8b has been deenergized so that the shutter blades 1 are positively held in the closed positions in order to avoid the false function of the composite magnet means 8. On the other hand, when the sector ring 2 is rotated by the motor 6 or the electric coil 11 and it abuts against the permanet magnet 8a so as to be held thereby at this position for holding the shutter blades 1 in the closed positions, the magnetic field of the permanent magnet 8a varies at the moment of contact thereof with the bent portion 2d of the sector ring 2 so that an induced voltage is generated in the electric coil 8b so as to be used to generate a shutter blade closure detecting signal. Therefore, the induced voltage in the electric coil 8b issues during the time the motor 6 or the electric coils 11 are still being energized in order to rotate the sector ring 2 for bringing the shutter blades 1 to the closed positions even though very short.

The present invention utilizes the coexistence of both the induced voltage in the electric coil 8b and the electric current energizing the motor 6 or the electric coils 11.

Thus, the output C of the AND circuit 27 is rendered to be high level at the moment the shutter blades 1 are brought to the closed positions and held thereat by the permanent magnet 8a so as to generate a shutter blade closure defecting signal which is supplied to a lens resetting circuit 28 of the automatic camera sequential operation control circuit shown in FIG. 10.

Figure 9:
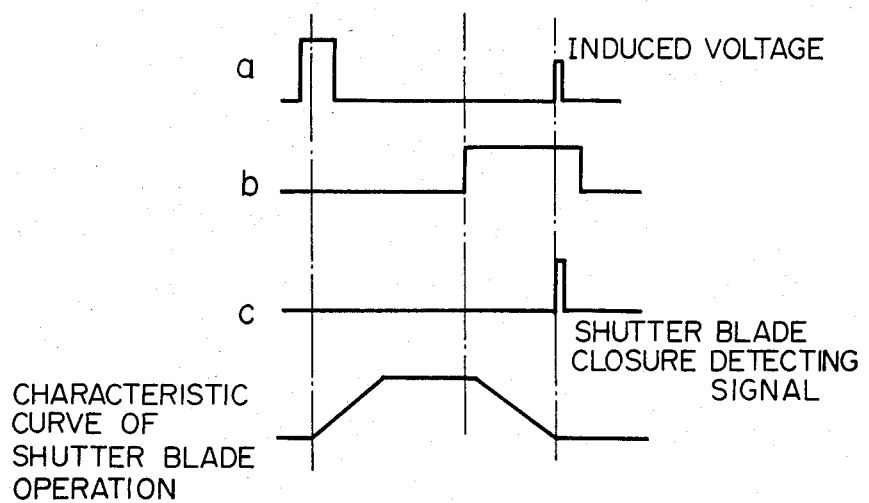
FIG. 9 is a time chart showing the operation of the control circuit of FIG. 8.

FIG. 9 shows the time chart of the operation of the control circuit of FIG. 8.

The automatic camera sequential operation control circuit shown in FIG. 10 comprises a release circuit 29, a battery checking circuit 30, an under-over-exposure checking circuit 31, an electromagnetic releasing circuit 32, the focusing circuit 23 previously described, a shutter operating circuit 33 including the exposure control circuit 17 shown in FIG. 8, a delay circuit 34, the lens resetting circuit 28 previously described, a film winding circuit 35, a film used-up detecting circuit 36, a film rewinding circuit 37, a range finding circuit 38, a power source latching circuit 39 and a light measuring circuit 40, etc., which are connected as shown.

The objective lens L is coupled with the focusing circuit 23, while the shutter S is connected to the shutter operating circuit 33 so as to be controlled thereby. Also, the film F is coupled with the film winding circuit 35 and the film used-up detecting circuit 36 for the required operation therefor.

The control circuit shown in FIG. 8 for issuing the shutter blade closure detecting signal is designated in FIG. 10 as being D. The circuit D is connected to the shutter operating circuit 33 actuated upon receipt of the output from the focusing circuit 23 as well as to the lens resetting circuit 28 as shown by the broken line so that the latter is actuated automatically so as to be ready for the succeeding operation of the camera.

Thus, the releasing of the holding means is initiated by the automatic focusing completion signal issued by the focusing circuit 23. In like manner as a safety insuring measure for the operation of the motor 6 or the electric coils 11, they are actuated in coupled relationship with the film winding operation effected by the film winding circuit 35.

What is claimed is:

1. Electromagnetic shutter for a camera having an exposure control circuit comprising:

shutter blades for opening and closing the aperture of said shutter;

a shutter control circuit having a photoelectric element for measuring the scene brightness as to generate a proper exposure signal for closing said shutter blades for the proper exposure after the same have been opened;

holding means for releasably holding said shutter blades in the closed positions;

said holding means comprising composite magnetic means consisting of a permanent magnet for holding said shutter blades in closed positions to close said aperture and an electrical coil wound about said permanent magnet for cancelling the magnetic force of said permanent magnet upon energization thereof, thereby permitting said shutter blades, which are held in their closed positions by said permanent magnet, to be released when said coil is energized for a short time period;

spring means for opening said shutter blades when the holding of said shutter blades in the closed positions by said holding means is released; and electromagnetic driving means actuated by said proper exposure signal of said shutter control circuit for driving said shutter blades from the open positions to the closed positions against the action of said spring means so as to permit said shutter blades to be held in the closed positions by said holding means.

2. Electromagnetic shtter as set forth in claim 1, for use with a camera sequential operation circuit, wherein said holding means generates a shutter blades closure detecting signal in said electric coil when said shutter blades are brought to their closed positions by virtu of variation in the magnetic field generated by said permanent magnet, thereby permitting a lens resetting operation to be carried out by said shutter blades closure detecting signal followed by a film winding operation.

3. Electromagnetic shutter as set forth in claim 1, wherein said holding means is integrally constructed with said electromagnetic driving means.

4. Electroagnetic shutter as set forth in claim 1, wherein said composite magnet means releases said shutter blades when said electrical coil is energized by virtue of the electromagnetic force generated by said electric coil acting against the magnetic force of said permanent magnet.

5. Electromagnetic shutter as set forth in claim 1, wherein said holding means generates a shutter blade closure detecting signal in said electric coil when said shutter blades are brought to the closed positions by virtue of variation in the magnetic field generated by said permanent magnet.

6. Electromagnetic shutter as set forth in claim 1 in combination with a camera sequential operation control circuit including an automatic focusing circuit, wherein an automatic focusing completion signal generated by said focusing circuit of said camera sequence circuit releases said holding means.

7. Electromagnetic shutter as set forth in claim 1 for use with a camera sequential operation control circuit, wherein said electromagnetic driving means is actuated by a signal generated by said camera sequential operation control circuit in coupled relationship with the termination of the film winding operation for insuring the safety.

8. Electromagnetic shutter of claim 6, wherein said control circuit comprises:

input means receiving input from a control processing unit for effecting the automatic sequential operations of said camera;

an electric power source;

a switch for said power source;

a one shot multivibrator circuit connected to said power source and receiving a signal from said input means so that a one shot output pulse is issued therefrom each time said signal is received; and an exposure control circuit having a photoelectric element.

9. Electromagnetic shutter as set forth in claim 1, wherein said electromagnetic driving means is provided with a transistorized braking circuit actuated during the time said shutter blades are being opened so as to apply a braking force to said shutter blades corresponding to the opening operation thereof and against the action of said spring means thereby reducing the opening velocity of said shutter blades.

10. Electromagnetic shutter as set forth in claim 2, in combination with a camera sequential operation control circuit including an automatic focusing circuit, wherein an automatic focusing completion signal generated by said focusing circuit of said camera sequence circuit releases said holding means.

11. Electromagnetic shutter of claim 10, wherein said control circuit comprises:

input means receiving input from a control processing unit for effecting the automatic sequential operations of said camera;

an electric power source;

a switch for said power source;

a one shot multivibrator circuit connected to said power source and receiving a signal from said input means so that a one shot output pulse is issued therefrom each time said signal is received; and an exposure control circuit having a photoelectric element.

12. Electromagnetic shutter as set forth in claim 1, wherein said electromagnetic driving means includes a braking circuit actuated when said shutter blades are being opened for applying a braking force to the shutter blades to lower the opening velocity of the shutter blades.

* * * * *